Oct. 10, 1939.  N. M. COUTY  2,175,456
MALE SWIVEL NUT CONNECTION
Filed Jan. 27, 1939   2 Sheets-Sheet 1
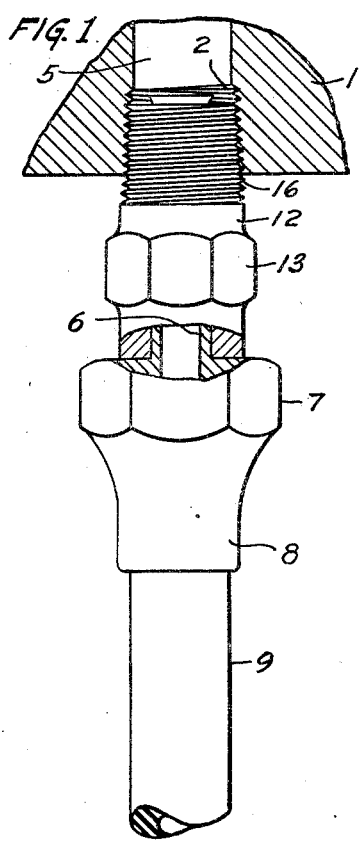
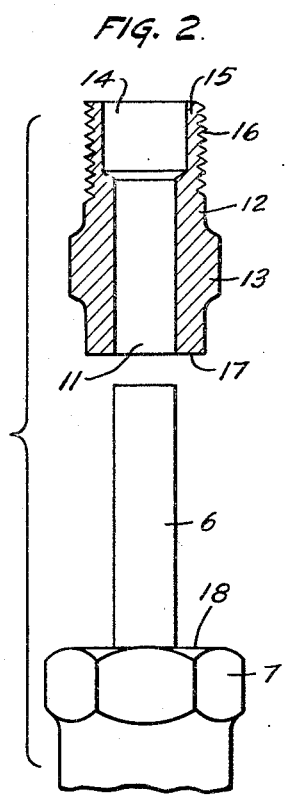
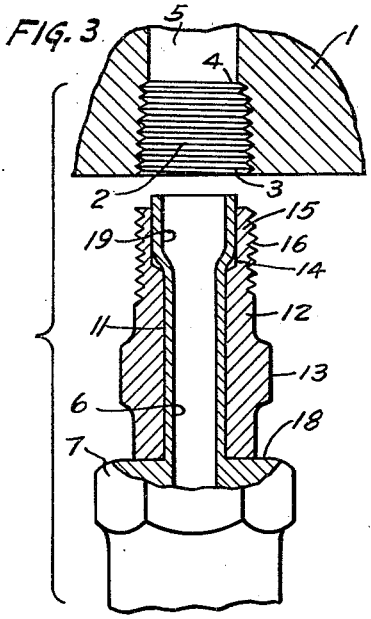
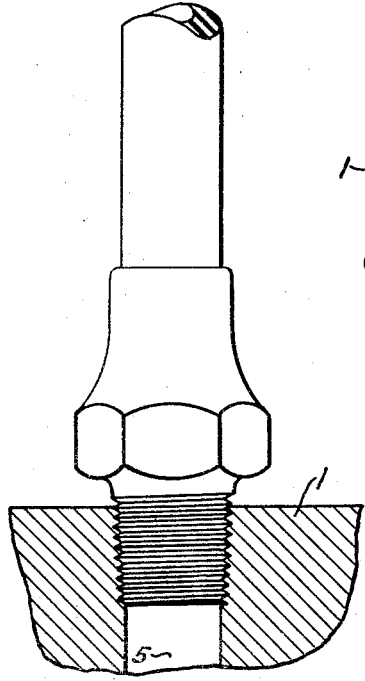
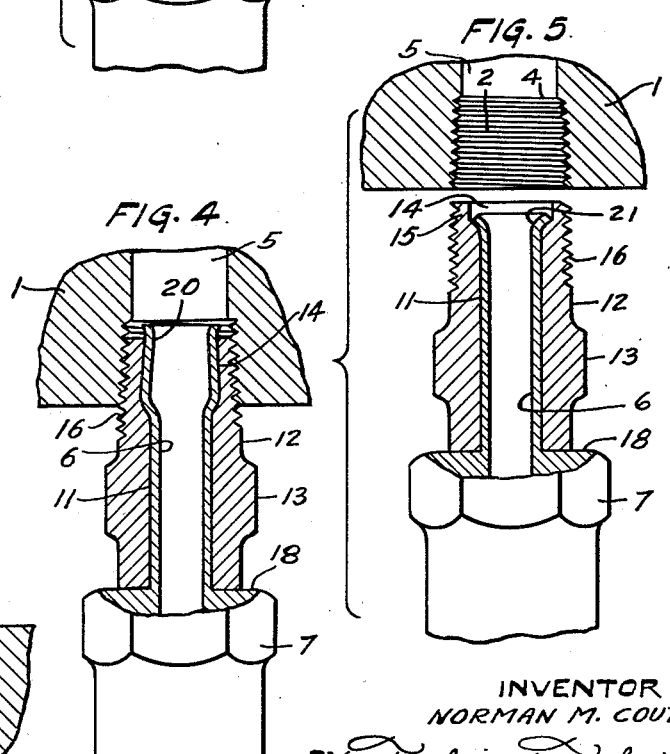
INVENTOR
NORMAN M. COUTY
BY
ATTORNEYS Oct. 10, 1939.   N. M. COUTY   2,175,456
MALE SWIVEL NUT CONNECTION
Filed Jan. 27, 1939   2 Sheets-Sheet 2
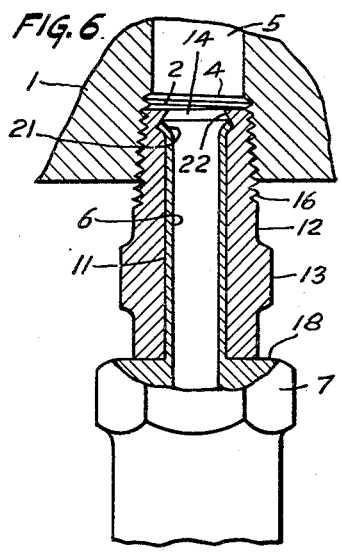
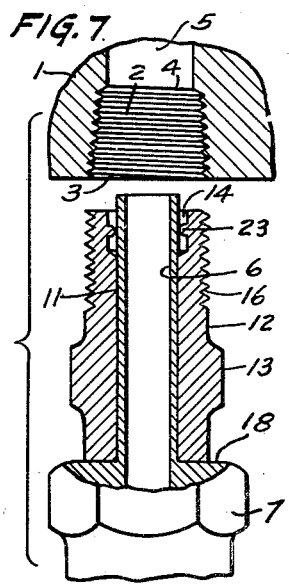
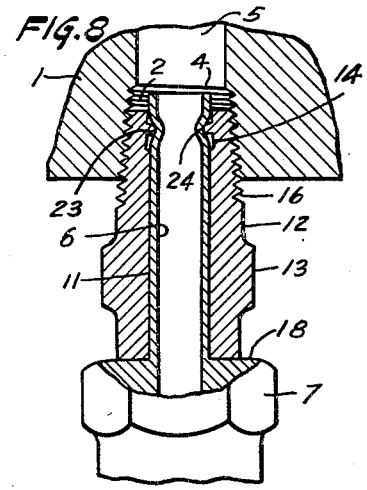
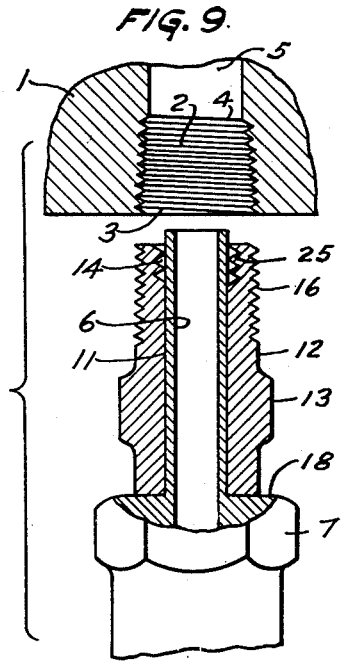
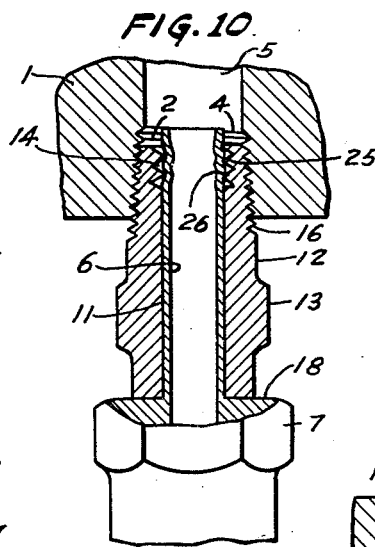
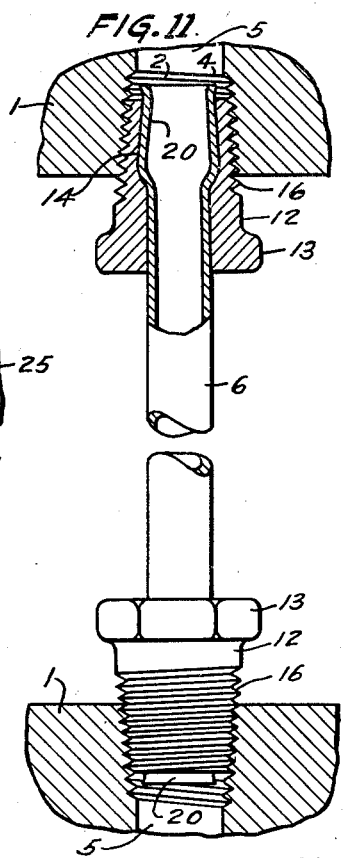
INVENTOR
NORMAN M. COUTY
BY
ATTORNEYS.

Patented Oct. 10, 1939

2,175,456

UNITED STATES PATENT OFFICE 2,175,456

MALE SWIVEL NUT CONNECTION

Norman M. Couty, Detroit, Mich., assignor to The Flex-O-Tube Company, Wilmington, Del., a corporation of Delaware Application January 27, 1939, Serial No. 253,080

2 Claims. (Cl. 285—56)

The object of this invention is to provide a swivel nut connection between a pipe and a stationary body, or between two pipes.

It is an object to provide such a connection that the parts can be assembled or disassembled by the simple rotation of a connecting nut and thereafter the parts will remain connected irrespective of the rotation of one with respect to the other.

It is the particular object of this invention to provide a connecting pipe and nut so arranged that the threading of the nut into its connection will deform or grip the pipe and prevent the pipe from being withdrawn.

It is an object of this invention to provide a nut which is adapted to be collapsed as it is threaded into a body having an internally threaded tapered portion and by such collapsing, is adapted to deform a pipe within the nut to prevent the pipe from being withdrawn from the nut, but at the same time, providing a freely rotatable, but tight, connection between the pipe and the nut.

It is an object of this invention to provide a means of connecting two stationary pipes or bodies, such that the union may be made or unmade without rotating or disturbing the stationary bodies.

Referring to the drawings:

Figure 1 is a side elevation, partially in section, of an assembly of the parts of this invention showing a pipe connected at one end by the male swivel nut connection of this invention.

Figure 2 shows the component parts of a pipe and the nut before assembly and before deformation.

Figure 3 shows the parts as assembled, but prior to insertion of the nut into the connecting member and before the collapse of the nut and the pipe in it.

Figure 4 is a section showing the parts of Figure 3 after the complete assembly and deformation of the nut.

Figure 5 is a section through the nut and pipe and the connecting body prior to assembly showing a modified form of nut and pipe.

Figure 6 is a similar view showing the parts assembled.

Figure 7 is a section through the nut, pipe and supporting body in disassembled condition. This is a modification of the previous figures.

Figure 8 is a view of the parts shown in Figure 7, but in their assembled collapsed condition.

Figure 9 is a view of another modification showing the parts in section in disassembled condition.

Figure 10 is a view of the same parts in section in their assembled condition.

Figure 11 is a view showing a complete pipe connected at both its ends to connecting bodies with a construction shown in Figures 3 and 4. In this instance, the connecting pipe is a pipe of metal from one connecting body to another, as distinguished from Figure 1, which shows the connecting pipe partly of metal and partly of resilient material, such as rubber.

The essential features of this invention are these: a deformable connecting pipe, a deformable male swivel nut, and an internally threaded female member, known as the connecting member, which is adapted to impress or collapse the nut, which in turn collapses or compresses the deformable pipe so as to cause the pipe and nut to internally interlock while permitting relative rotatable movement between the pipe on one hand and the nut or connecting body or female member on the other hand.

The great advantages of this connection are these: that it is possible to readily assemble and disassemble such a connection without rotating the pipe or the body to which it is connected, but simply by rotating the nut by hand or by an ordinary tool. There are no gaskets or other similar bodies to be inserted which might leak. Free rotation is preserved between the bodies and if the pipe is broken during the deformation, it is not material because the long engaging sleeve of the pipe with the nut makes a relatively tight joint, which joint is still made tighter by the interlocking of the nut and the pipe as the result of the joint deformation of the tube. The further result of the deformation is to prevent the pipe from being withdrawn from the nut and the body to which it is connected, while still permitting it to freely rotate. It will be apparent that this invention is adaptable to various types of machinery, but is of particular use in connecting copper and brass pipe and rubber hose to various parts of automotive engines, to filters and in a variety of different applications.

Referring to the drawings in detail, I designates the connecting body that has the female thread 2, which is a tapered thread being larger at the mouth 3 than at the base of the thread, as at 4. This thread is formed in the passageway 5. It will be understood that this may be a passageway in a nut, a cylinder block or any other type of connecting body.

The pipe, which is preferably of brass, copper or some similar deformable material, is designated 6 and is connected in some cases to a nut 7, which is a part of a hose connector, as shown in Figure 1. This hose connector has a skirt 8 which grips one end of a rubber hose 9.

The exact nature of the other end of this invention is of no importance in this invention, as there are a wide variety of different connections that may be employed. The other end of the hose may be connected by any standard form of connection, or by a connection of this invention.

Referring to Figure 11, it will be seen that this invention may be employed by having the pipe 6 connected at opposite ends by the male swivel nut connection of this invention so that the nut 7 and its associated parts are unnecessary, except for interconnecting a different kind of pipe to the pipe 6.

Returning to the particular parts of the mechanism which are involved in this invention, the pipe 6 is a tube that is preferably formed of a substantial uniform diameter that fits within the cylinder barrel 11 of the male swivel nut 12, which has a multiple phase exterior portion 13 for engagement with the tool to rotate it. This cylindrical barrel 11 is enlarged, as at 14. This enlargement results in the reduction of the thickness of the wall 15 of the nut. The exterior of this wall is threaded as at 16. The diameter of this thread is substantially constant. It will be recalled that the thread 2 of the supporting body or connection constituting the female member is tapered.

The outer end 3, however, is of such diameter to readily take the male thread 16 to start the two bodies into engagement with one another. If desired, after the pipe 6 is inserted within the nut 12, its inner end, which projects within the enlarged chamber 14, may be expanded by a tool, as indicated in Figure 3, or Figure 5. When so assembled, the outer shoulder 17 of the nut 12 engages with the face 18 of the nut or connection 7 so as to form a rotating joint, but a relatively tight one.

Thereafter the nut 12 is threaded, as the male member within the female thread of the supporting member 1. The result is to convert the cylindrical wall 15 of the male nut into a tapered body as shown in Figures 4, 6, 8, 10 and 11. The result of this inward contraction or collapse of the nut, which is preferably of brass or copper or similar materials, is that the pipe at its extreme end is further deformed. It will be recalled that it was already deformed once, as at 19 by pre-deformation through the use of a tool. The result of the collapse of the threaded end 15 of the nut is to bring about a contraction of the mouth of the tube 6, as at 20 in Figure 4.

In Figure 5, the end of the pipe 6 is flared, prior to the assembly of the parts, as at 21 and is arranged so that the flared end 21 is within the end of the thin sleeve portion 15 of the nut, that is, within the end of the chamber 14. When the assembly takes place, the result is as shown in Figure 6, by which the end of the male threaded member is collapsed so that the end of the chamber 14 is restricted, as at 22, and therefore overlaps the flared end 21 of the pipe 6, which makes a tight joint, holds the several parts together, but permits rotation of the pipe with respect to the nut.

Turning to the modification shown in Figures 7 and 8, where this same principle is practiced in a different manner, which is partly that of Figure 4 and Figure 6, the chamber 14 is formed with an internal rib 23. The end of the pipe 6 may or may not project behind the chamber 14. When the assembly of the parts takes place, as in Figure 8, this rib is, of course, moved inwardly, causing it to engage with the wall of the pipe 6 to form a groove 24 therein, so that there is interlocking engagement between the nut 12 and the pipe 6. In this way, the rotative engagement is maintained, but a tight joint is effected and the pipe is prevented from being withdrawn from the connection.

In Figures 9 and 10, there is a modification of Figures 7 and 8. It will be noted that instead of a rib 23 having a rounded outer surface, the nut 12 is internally threaded, as at 25, so that the sharp edges of the internal thread in the chamber 14 of the nut 12 engage at multiple points the deformable bodies or surfaces of the pipe 6 so as to form a plurality of grooves or depressions 26 in the pipe to effect the purposes heretofore described. Figure 11 shows one of the typical connections. In this instance, the pipe 6 is a metal pipe that connects the two supporting bodies by the connections of this invention.

It will be understood that materials having the characteristics of being deformed and the like may be employed and there is no intention to restrict this invention to any particular materials.

It will be understood that I desire to comprehend within my invention such modifications as may be necessary to adapt it to varying conditions and uses.

Having thus fully described my invention, what I claim as new and desire to secure by Letters Patent, is:

1. In combination, a connecting member having a tapered female thread, a deformable pipe, a male swivel nut freely mounted on said pipe and having an exterior thread of uniform diameter whereby when said nut is inserted in said female member, it is collapsed partially and partially collapses the adjacent end of said pipe to interlock therewith and prevent the withdrawal of the pipe while permitting its rotation therein.

2. In combination, a female connecting member provided internally with a tapered thread, a pipe having its end inserted within said female member and being outwardly deformed adjacent its inserted end, a male nut having a counterbore surrounding the deformed portion of said pipe, said nut being provided externally with a thread of less taper than said thread on said female member and being screw-threadedly received in said female member and thereby inwardly deformed to interengage with the deformed portion of said pipe, whereby said pipe is fluid-tightly connected with said female member but is free to rotate with respect to said nut and female connector.

NORMAN M. COUTY.